Patented June 8, 1948

2,443,062

UNITED STATES PATENT OFFICE 2,443,062

METHOD OF PREPARING OXAZOLIDINES

Benjamin Abramovitch, Stamford, Conn., assignor to American Cyanamid Company, New York, N. Y., a corporation of Maine No Drawing. Application January 23, 1946, Serial No. 642,988

8 Claims. (Cl. 260—307)

The present invention relates to an improved method for producing oxazolidines and more particularly to an improvement on the method set forth in copending application Serial No. 642,987 filed January 23, 1946.

The oxazolidines to which the invention pertains are 2-imino-3-aliphatic oxazolidines. Such oxazolidines are prepared by reacting a cyanogen halide with an N-aliphatic monoethanolamine, i. e., a secondary monoethanolamine in which the second substituent is an aliphatic radical.

In particular, the invention contemplates that 2-imino-3-aliphatic oxazolidines may be prepared in improved yields by the reaction of a cyanogen halide with an N-aliphatic monoethanolamine in the presence of a hydrogen halide acceptor having a basicity greater than the N-aliphatic monoethanolamine. Alkali metal and alkaline earth metal oxides, alkoxides, and hydroxides are examples of strong hydrogen halide acceptors.

The 2-imino-3-aliphatic oxazolidines are strong bases. Likewise, the N-aliphatic monoethanolamines are also strong bases. The reaction of the cyanogen halide with an N-aliphatic monoethanolamine produces only a small amount of the corresponding oxazolidine. Because these two compounds are of approximately the same basicity, they compete with each other in the acceptance of the hydrogen halide that is formed in this reaction. As soon as any hydrogen halide is liberated in the reaction, not only the hydrohalide of the substituted oxazolidine but also that of the substituted ethanolamine is formed. As the amount of substituted ethanolamine hydrohalide increases, its reaction rate with the cyanogen halide approaches zero, and further effective production of 2-imino-3-aliphatic oxazolidine is not realized. This results in very low yields of the 2-imino-3-aliphatic oxazolidines. This poor yield is in marked contrast to the high yields of 2-imino-3-aryl oxazolidines which are obtained when N-aryl monoethanolamines are used. The basicity of the aromatic monoethanolamines is much lower than that of the 2-imino-3-aryl oxazolidines. In the reaction of a cyanogen halide with an N-aryl monoethanolamine, the resulting 2-imino-3-aryl oxazolidine accepts the hydrogen halide almost completely so that a high yield of the aromatic oxazolidine is obtained.

When practicing the method of the present invention, it is preferred that the N-aliphatic monoethanolamine and the hydrogen halide be mixed in a solvent or diluent which will not enter into the reaction under the conditions employed in the present invention. Such solvents and diluents may be ethers, alcohols, ketones, aromatic and aliphatic hydrocarbons and the like. It is preferable to provide a medium in which the particular N-aliphatic monoethanolamine is soluble and the corresponding 2-imino-3-aliphatic oxazolidine and the alkali metal or alkaline earth metal halide are insoluble. Because of the desirability of providing for solution of the starting ethanolamine, it is sometimes necessary to employ alcoholic solvents but otherwise it is preferable to avoid such hydroxylic solvents. Likewise, the presence of water, although it may be tolerated, is to be avoided because of decreased yields and a tendency to render the separation of the metal halide less easy.

The cyanogen halide, generally the chloride or bromide but preferably the chloride, may be added to the reaction mixture either as a liquid, as a gas introduced above or below the surface of the reaction mixture, or dissolved in a solvent such as benzene, hexane, and the like.

The reaction proceeds smoothly with the production of an alkali metal or alkaline earth metal halide and a 2-imino-3-aliphatic oxazolidine. The latter may be recovered as the free base or as a salt, whichever proves to be more convenient. If it is desired to recover the oxazolidine as a salt, the alkali metal halide may be removed and the organic solvent solution of the oxazolidine treated with acid, preferably an anhydrous acid, such as gaseous hydrogen chloride. The acid salt usually precipitates and may be easily recovered.

The oxazolidines of the present invention are useful as insecticides and chemical intermediates in the production of pharmaceutical and chemotherapeutic agents, textile and dyeing agents, resins, plastics, and the like. In many cases salts which may be prepared by treating the oxazolidine with acidic materials such as HCl, $H_2SO_4$, $H_3PO_4$, acetic acid, propionic acid, phenol and the like are employed instead of the free oxazolidine.

The N-substituted monoethanolamines which are not commercially available and which are used as reagents in the present invention are readily prepared by simple and straight-forward known chemical methods. Several substituted ethanolamines are prepared by the reaction of ethylene oxide with a primary amine. Ethanolamines, similar to that used in Example 6, are prepared by reacting a substituted ethylene oxide with a primary amine. The β-carbamylethylethanolamine used in Example 5 is prepared by the careful addition of a stoichiometric amount of acrylamide to ethanolamine while the temperature is maintained high enough to insure a clear melt. When this melt is cooled to room temperature the crude solid β-carbamylethylethanolamine is used without further purification. The preparation of the β-N-substituted-carbamylethylethanolamines which are used in Examples 7–10 involves several steps. A stoichiometric amount of ethanolamine is carefully added to ethyl acrylate. The resulting ethyl hydroxyethyl-β-aminopropionate is then treated with either dodecylamine, tetradecylamine, hexadecylamine, or octadecylamine at approximately 100° C. to produce the desired β-N-substituted-carbamylethylethanolamine. A theoretical amount of ethanol is distilled from this reaction mixture. When cooled to room temperature a waxy solid is obtained, and these β-N-substituted-carbamylethylethanolamines are used in Examples 7–10 without further purification.

EXAMPLE 1

*2-imino-3-butyloxazolidine*

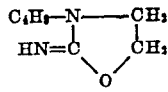

(A)

| Reagents | Molar Ratio |
|---|---|
| Butylethanolamine | 1.00 |
| Hexane | 3.80 |
| Cyanogen chloride | 1.00 |
| Benzene | 2.25 |

The butylethanolamine is dissolved in the hexane, and the resulting solution is cooled to 5° C. by means of external cooling. The solution of cyanogen chloride in benzene is added slowly to the agitated reaction mixture, so that the temperature does not exceed 30° C. During the reaction the mixture separates into two liquid phases, and after the addition of cyanogen chloride is completed, the mixture is first stirred at room temperature for about 45 minutes and then at 40°–50° C. for about 20 minutes. The light brown oily phase is separated from the hexane-benzene solution and dissolved in water to form an aqueous solution. This solution is treated with an excess of 10% sodium hydroxide until the pH is 9–10, and extracted several times with ether. After combining and drying the ether extracts, the ether is removed by distillation and the residue distilled at 74°–75° C./3 mm. to obtain 2-imino-3-butyloxazolidine in 11% yield of theoretical. The hydrochloride salt may be prepared by adding HCl gas to a benzene solution of 2-imino-3-butyloxazolidine until a slight excess of the acid is present. Filtration of the precipitate yields a colorless crystalline solid which melts at 145°–147° C.

(B)

| Reagents | Molar Ratio |
|---|---|
| Butylethanolamine | 1.0 |
| Cyanogen chloride | 1.0 |
| Sodium hydroxide | 1.0 |
| Benzene | 7.9 |

A slurry of the butylethanolamine and sodium hydroxide, preferably in powdered form, in about two-thirds of the above amount of benzene is prepared. The cyanogen chloride, dissolved in the remainder of the benzene, is added to the slurry at a rate of one mol per 1.25–1.50 hours and the temperature during reaction is maintained at 5°–15° C. After the addition of the cyanogen chloride is completed, the reaction mixture is stirred at room temperature for about 2 hours. The sodium chloride which is formed during the reaction is removed and washed with several small portions of benzene. After combining the washings and the filtrate the benzene is removed under vacuum leaving an oily residual liquid which is distilled at 74°–75° C./3 mm. to provide 2-imino-3-butyloxazolidine in 71% yield of theoretical.

EXAMPLE 2

*2-imino-3-dodecyloxazolidine*

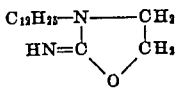

(A)

| Reagents | Molar Ratio |
|---|---|
| Dodecylethanolamine | 1.00 |
| Hexane | 6.15 |
| Cyanogen chloride | 1.00 |

The hexane solution of dodecylethanolamine is cooled to 10° C. which causes some of the amine to precipitate. To this agitated slurry is then added the cyanogen chloride, either dropwise or as a gas. The reaction becomes exothermic, and the temperature is allowed to rise to about 35°–40° C., which is substantially the temperature maintained during the addition of the cyanogen chloride. After addition is completed, the reaction mixture is stirred until the temperature drops spontaneously to 20°–25° C. The crystalline waxy 2-imino-3-dodecyloxazolidine hydrochloride is recovered, and after recrystallization from benzene the product, obtained in a yield of 14.1% of theoretical, melts at 161°–162° C.

To obtain the free base the hydrochloride of 2-imino-3-dodecyloxazolidine is dissolved in water and treated dropwise with the stoichiometric amount of 10% aqueous sodium hydroxide. An insoluble oil, 2-imino-3-dodecyloxazolidine, separates, and after being extracted with ether, the ethereal solution is dried over anhydrous sodium sulfate. The ether is removed and the residue, 2-imino-3-dodecyloxazolidine, is not further purified because it is unstable at the temperatures required for distillation.

(B)

| Reagents | Molar Ratio |
|---|---|
| Dodecylethanolamine | 1.0 |
| Cyanogen chloride | 1.0 |
| Sodium hydroxide | 1.1 |
| Benzene | 13.5 |

The dodecylethanolamine, the sodium hydroxide, preferably in powdered form, and the benzene are mixed and thoroughly agitated. The cyanogen chloride is added to this agitated mixture at a rate of substantially 2 mols per hour. During reaction the temperature is maintained at 5°–15° C. After the cyanogen chloride addition is completed, the reaction mixture is stirred at room temperature for about an hour. The sodium chloride which forms during the reaction is removed, and the clear yellow benzene solution may be concentrated to yield the waxy free base, crude 2-imino-3-dodecyloxazolidine. However, since this material is more easily recovered as the hydrochloride, the aforementioned yellow benzene solution is best treated with approximately a stoichiometric amount of gaseous HCl at a temperature range of 5°–30° C. After removing the benzene under vacuum, the crude waxy hydrochloride salt is digested with boiling acetone, the solid is filtered, and washed with cold acetone. Additional impurities can be removed by a second digestion in hot acetone. The crystalline 2-imino-3-dodecyloxazolidine hydrochloride obtained therefrom in a yield of 62% of theoretical melts at 161°–162° C.

Example 3

*2-imino-3-cyclohexyloxazolidine*

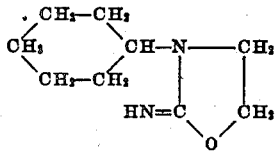

| Reagents | Molar Ratio |
| --- | --- |
| Cyclohexylethanolamine | 1.0 |
| Cyanogen chloride | 1.0 |
| Sodium hydroxide | 1.0 |
| Benzene | 6.5 |

The benzene slurry of cyclohexylethanolamine and sodium hydroxide, preferably in powdered form, is agitated and cooled to 0°–5° C. while the cyanogen chloride is added at the rate of one mol per 45–65 minutes. During reaction the temperature is allowed to rise slowly to about 15° C., and after the addition of the cyanogen chloride is completed, the reaction mixture is stirred for about 3 hours at approximately 30° C. The sodium chloride formed during the reaction is removed and washed with benzene. The benzene washings and the filtrate are combined and the benzene removed under reduced pressure. The residue is crude 2-imino-3-cyclohexyloxazolidine which is distilled at 115°–116° C./3 mm. The hydrochloride salt may be prepared by treating the free base with approximately a stoichiometric amount of HCl. After this colorless solid is recovered and dried it melts at 197°–198° C.

It may be desirable to recover the 2-imino-3-cyclohexyloxazolidine as the hydrochloride without resorting to the above mentioned vacuum distillation. In this case the benzene filtrate, containing the free base, is treated with gaseous HCl, precipitating colorless 2-imino-3-cyclohexyloxazolidine hydrochloride which melts, after recrystallization from ethanol, at 197°–198° C.

Example 4

*2-imino-3-octadecyloxazolidine*

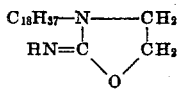

| Reagents | Molar Ratio |
| --- | --- |
| Octadecylethanolamine | 1.0 |
| Cyanogen chloride | 1.0 |
| Sodium hydroxide | 1.0 |
| Benzene | 11.3 |

The octadecylethanolamine is dissolved in the benzene and, the sodium hydroxide, preferably in powdered form, is added to this solution. This stirred mixture is cooled to approximately 15° C., and the cyanogen chloride addition is started. During reaction the temperature is allowed to rise to substantially 30° C. and the addition rate of the cyanogen chloride is approximately one mol per 30 minutes. After the addition of the cyanogen chloride is completed, the reaction mixture is stirred at 20°–30° C. for 1–2 hours. The gelatinous sodium chloride which forms during the reaction is removed by means of a centrifuge and washed with several small portions of benzene. The filtrate and washings containing 2-imino-3-octadecyloxazolidine are combined and cooled to substantially 5° C. A slight excess of gaseous hydrogen chloride over the theoretical amount required is added at a rate of about 2.5 mols an hour, and the temperature is maintained below 25° C. Removal of the benzene and any excess hydrogen chloride under reduced pressure leaves a waxy residue of 2-imino-3-octadecyloxazolidine hydrochloride which is then digested in boiling acetone for approximately 30 minutes. This mixture is then cooled to 0°–15° C., the solid filtered, washed with cold acetone, and air dried. Purification of 2-imino-3-octadecyloxazolidine hydrochloride may also be accomplished by crystallization from ethanol and/or from a mixture of acetone and benzene. The melting point of the purified hydrochloride salt of 2-imino-3-octadecyloxazolidine is 93°–95° C. The free base may be isolated by evaporating the original benzene solution, obtained after the removal of sodium chloride from the reaction mixture. The 2-imino-3-octadecyloxazolidine so obtained is a gummy waxy material which may also be prepared by the addition of substantially a stoichiometric amount of sodium hydroxide to a solution of the hydrochloride salt.

Example 5

*2-imino-3-β-carbamylethyloxazolidine*

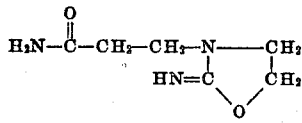

| Reagents | Molar Ratio |
| --- | --- |
| β-Carbamylethylethanolamine | 1.0 |
| Cyanogen chloride | 1.0 |
| Sodium ethoxide | 1.0 |
| Ethanol | 7.6 |

The β-carbamylethylethanolamine is dissolved in about one-half of the above amount of ethanol, and the solution cooled to about 0°–5° C. The cyanogen chloride is then added at the rate of approximately one mol per 2 hours while the temperature is kept below substantially 15° C. The sodium ethoxide dissolved in the remaining amount of the above ethanol is added to this reaction mixture to neutralize the HCl formed. During this addition, the temperature is not allowed to rise above approximately 30° C., and the reaction mixture is then stirred for 1–2 hours. The sodium chloride which is formed is then removed by filtration, and the resultant clear filtrate is evaporated to dryness at reduced pressure to yield crude 2-imino-3-β-carbamylethyloxazolidine. In order to remove some impurities from this crude 2-imino-3-β-carbamylethyloxazolidine, it is digested in boiling ethanol, cooled, filtered, and washed with a small amount of fresh, cold ethanol. 2-imino-3-β-carbamylethyloxazolidine may also be recrystallized from aqueous ethanol to yield colorless plates melting at 190° C.

EXAMPLE 6

*2-imino-3-butyl-5-phenyloxazolidine*

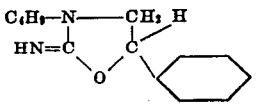

| Reagents | Molar Ratio |
|---|---|
| 1-Phenyl-2-butylaminoethanol-1 | 1.0 |
| Cyanogen chloride | 1.0 |
| Sodium hydroxide | 1.0 |
| Benzene | 6.8 |

The 2-phenyl-2-butylaminoethanol-1 is dissolved in the benzene, and the sodium hydroxide, preferably in powdered form, is added to this solution. The resultant agitated mixture is cooled to approximately 5° C. and the cyanogen chloride added at the rate of approximately one mol per hour, during which time the temperature is not allowed to rise above about 25° C. When the cyanogen chloride addition is complete, the reaction mixture is stirred at room temperature for approximately an hour, and the sodium chloride which forms during the reaction, is then removed and washed with small portions of benzene. The washings and filtrate are combined, and the benzene removed under reduced pressure, yielding a residue of crude 2-imino-3-butyl-5-phenyloxazolidine, which is a straw colored oily material that does not crystallize readily. This oily material is redissolved in benzene, and the solution treated with an amount of dry gaseous hydrogen chloride slightly in excess of the theoretical requirements while the temperature is maintained at approximately 0°-5° C. On standing, 2-imino-3-butyl-5-phenyloxazolidine hydrochloride crystallizes from the benzene solution. After recovery and crystallization from methanolic acetone, the hydrochloride melts at 148°-149° C.

EXAMPLE 7

*2 - imino - 3 - (β - N - octadecylcarbamyl) -ethyloxazolidine*

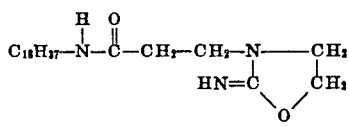

| Reagents | Molar Ratio |
|---|---|
| β-N-Octadecylcarbamylethylethanolamine | 1.0 |
| Cyanogen chloride | 1.0 |
| Sodium hydroxide | 1.0 |
| Benzene | 22.5 |

The β-N-octadecylcarbamylethylethanolamine, the sodium hydroxide, preferably in powdered form, and the benzene are mixed and thoroughly agitated. The cyanogen chloride is added to the mixture at the rate of approximately 1.5 mols per hour, while the temperature is kept below about 35° C. After the addition of the cyanogen chloride is completed, the mixture is stirred for about an hour at 25°-30° C. The sodium chloride which forms during this reaction is removed by filtration and washed with several small portions of benzene. The combined washings and filtrate are cooled to about 5° C. This solution containing 2 - imino-3-(β-N-octadecylcarbamyl) - ethyloxazolidine is stirred while a slight excess of gaseous hydrogen chloride over the theoretical amount required is added in about two hours. The benzene is removed under reduced pressure, and the sticky residue of crude 2-imino-3-(β-N-octadecylcarbamyl)-ethyloxazolidine hydrochloride is digested in boiling acetone for about an hour, then cooled to 0°-10° C. After filtering under pressure the solid is washed with small portions of fresh, cold acetone to yield slightly impure 2-imino-3-(β-N-octadecylcarbamyl)-ethyloxazolidine hydrochloride melting at 139°-140° C.

The free base 2-imino-3-(β-N-octadecylcarbamyl)-ethyloxazolidine, may be prepared by treating the hydrochloride salt with approximately a stoichiometric amount of sodium hydroxide. After removal of the sodium chloride the free base is a sticky gummy product.

EXAMPLE 8

*2 - imino - 3 - (β-N-hexadecylcarbamyl) -ethyloxazolidine*

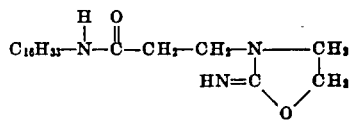

| Reagents | Molar Ratio |
|---|---|
| β-N-Hexadecylcarbamylethylethanolamine | 1.0 |
| Cyanogen chloride | 1.0 |
| Sodium hydroxide | 1.0 |
| Benzene | 17.0 |

The procedure for preparing 2-imino-3-(β-N-hexadecylcarbamyl)-ethyloxazolidine is substantially the same as that reported in Example 7. The cyanogen chloride is added to the benzene slurry of the β-N-hexadecylcarbamylethylethanolamine and sodium hydroxide, preferably in powdered form, at a rate of about one mol per hour. During reaction the temperature is not allowed to rise above approximately 30° C. After the completion of the addition of the cyanogen chloride, the reaction mixture is stirred at room temperature for about 2 hours. After removal of the sodium chloride formed during the reaction, the benzene filtrate is treated with substantially a stoichiometric amount of gaseous hydrogen chloride in a temperature range of 0°-10° C. and the benzene solution concentrated at reduced pressure to yield crude 2-imino-3-(β-N-hexadecylcarbamyl) - ethyloxazolidine hydrochloride. For purification, the crude hydrochloride is digested in acetone, filtered, and dried to yield a waxy solid. The free base may be prepared by the addition of a stoichiometric amount of aqueous sodium hydroxide to the hydrochloride salt to obtain a sticky oily material.

EXAMPLE 9

*2-imino-3-(β-N-tetradecylcarbamyl) -ethyloxazolidine*

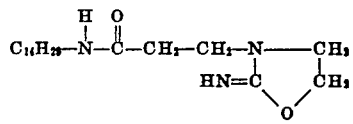

| Reagents | Molar Ratio |
|---|---|
| β-N-Tetradecylcarbamylethylethanolamine | 1.0 |
| Cyanogen chloride | 1.0 |
| Sodium hydroxide | 1.0 |
| Benzene | 17.0 |

The procedure followed in the preparation of 2-imino-3-(β-N-tetradecylcarbamyl)-ethyloxazolidine is essentially the same as that reported in Example 7. The cyanogen chloride is added to the benzene slurry of the β-N-tetradecylcarbamylethylethanolamine and sodium hydroxide, preferably in powdered form, at a rate of 1.0–1.5 mols per hour while the temperature is maintained below 25° C. After addition, the reaction mixture is stirred for about an hour. The sodium chloride, which forms during the reaction is removed and approximately a stoichiometric amount of gaseous hydrogen chloride is added at a temperature range of 0°–10° C. The benzene is removed at reduced pressure to yield a tan waxy solid, 2-imino-3-(β-N-tetradecylcarbamyl)-ethyloxazolidine hydrochloride. The free base, prepared by treating the hydrochloride with an equivalent of sodium hydroxide is a sticky oily material.

EXAMPLE 10

2-imino-3-(β-N-dodecylcarbamyl)-ethyloxazolidine

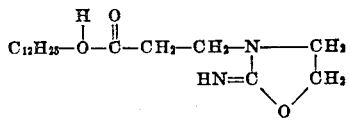

| Reagents | Molar Ratio |
|---|---|
| β-N-Dodecylcarbamylethylethanolamine | 1.0 |
| Cyanogen chloride | 1.0 |
| Sodium hydroxide | 1.0 |
| Benzene | 11.3 |

The procedure for preparing 2-imino-3-(β-N-dodecylcarbamyl)-ethyloxazolidine is substantially the same as that described in the above examples. The cyanogen chloride is added to the benzene slurry of the β-dodecylcarbamylethylethanolamine and sodium hydroxide, preferably in powdered form, at the rate of approximately one mol per hour while the temperature is kept below substantially 25° C. After the addition of the cyanogen chloride is completed the reaction mixture is stirred for about an hour. The sodium chloride which forms in the reaction is removed by filtration and the benzene filtrate is then treated with substantially a stoichiometric amount of gaseous hydrogen chloride at a temperature range of 0°–10° C. Concentration of the benzene under reduced pressure yields 2-imino-3-(β-N-dodecylcarbamyl)-ethyloxazolidine hydrochloride as a slightly sticky waxy solid. Treatment of the hydrochloride with a stoichiometric amount of aqueous sodium hydroxide yields the free base in the form of a viscous oil.

EXAMPLE 11

2-imino-3-ethyloxazolidine

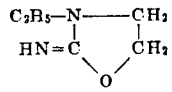

| Reagents | Molar Ratio |
|---|---|
| Ethylethanolamine | 1.00 |
| Cyanogen chloride | 1.00 |
| Sodium hydroxide | 1.05 |
| Benzene | 5.60 |

The agitated benzene slurry of ethylethanolamine and sodium hydroxide, preferably in powdered form, is cooled to about 5° C., and the cyanogen chloride is added to this agitated reaction mixture at the rate of one mol per 60–75 minutes, while the temperature is allowed to reach 20–25° C. Stirring is then continued for about 2 hours, and the temperature is allowed to reach 30°–35° C. The sodium chloride which is formed in the reaction is removed by filtration and washed with benzene. The combined washings and filtrate are concentrated under reduced pressure. Distillation of the residue yields 2-imino-3-ethyloxazolidine boiling at 59°–60° C./3 mm.

EXAMPLE 12

2-imino-3-butyloxazolidine

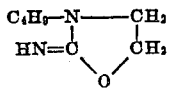

| Reagents | Molar Ratio |
|---|---|
| Butylethanolamine | 0.5 |
| Cyanogen chloride | 0.5 |
| Calcium oxide | .28 |
| Benzene | 2.25 |

A slurry of the butylethanolamine and calcium oxide, preferably in powdered form, in about two-thirds of the above amount of benzene is cooled to 0° C. The cyanogen chloride, dissolved in the remainder of the benzene, is added to the slurry over a period of 50 minutes during which time the temperature is maintained between 0° and 10° C. After the addition of the cyanogen chloride is completed, the reaction mixture is stirred at room temperature for about one hour. Upon stopping the agitation, the reaction mixture separates into two phases, the calcium oxide being suspended in a benzene insoluble oil. The benzene layer is removed, clarified, and distilled to remove the solvent. Distillation of the residue at 74–75° C./3 mm. yields the product which is 2-imino-3-butyloxazolidine.

What is claimed is:

1. A method of preparing 2-imino-3-aliphatic oxazolidines which comprises reacting a cyanogen halide with an N-aliphatic monoethanolamine in the presence of a hydrogen halide acceptor selected from the group consisting of alkaline earth metal and alkali metal oxides, alkoxides, and hydroxides.

2. A method of preparing 2-imino-3-aliphatic oxazolidines which comprises reacting a cyanogen halide with an N-aliphatic monoethanolamine in the presence of an alkali metal hydroxide.

3. A method of preparing 2-imino-3-aliphatic oxazolidines which comprises reacting in a diluent cyanogen chloride with an N-aliphatic monoethanolamine in the presence of an alkali metal hydroxide at a temperature range of substantially 0°–50° C.

4. A method of preparing 2-imino-3-aliphatic oxazolidines which comprises reacting in a diluent cyanogen chloride and an N-aliphatic monoethanolamine in the presence of sodium hydroxide at a temperature range of substantially 0°–50° C.

5. A method of preparing 2-imino-3-aliphatic oxazolidines which comprises reacting in a nonhydroxylic liquid cyanogen chloride and an N-aliphatic monoethanolamine in the presence of sodium hydroxide at a temperature range of substantially 0°–50° C.

6. A method of preparing 2-imino-3-dodecyloxazolidine which comprises reacting in benzene cyanogen chloride with dodecylethanolamine in the presence of sodium hydroxide at a temperature range of 0°–50° C. to form 2-imino-3-dodecyloxazolidine and recovering the latter.

7. A method of preparing 2-imino-3-butyl-5-phenyloxazolidine which includes the steps of reacting in benzene cyanogen chloride with 1-phenyl-2-butylaminoethanol-1 in the presence of sodium hydroxide at a temperature range of 0°–50° C. to form 2-imino-3-butyl-5-phenyloxazolidine and recovering the latter.

8. A method of preparing 2-imino-3-($\beta$-N-octadecylcarbamyl)-ethyloxazolidine which includes the steps of reacting in benzene cyanogen chloride with ($\beta$-N-octadecylcarbamyl)-ethylethanolamine in the presence of sodium hydroxide at a temperature range of 0°–50° C. to form 2-imino-3-($\beta$-N-octadecylcarbamyl) - ethyloxazolidine and recovering the latter.

BENJAMIN ABRAMOVITCH.